March 10, 1931.  H. T. SEELEY  1,796,220
STARTING ARRANGEMENT FOR DYNAMO ELECTRIC MACHINES
Filed May 21, 1929
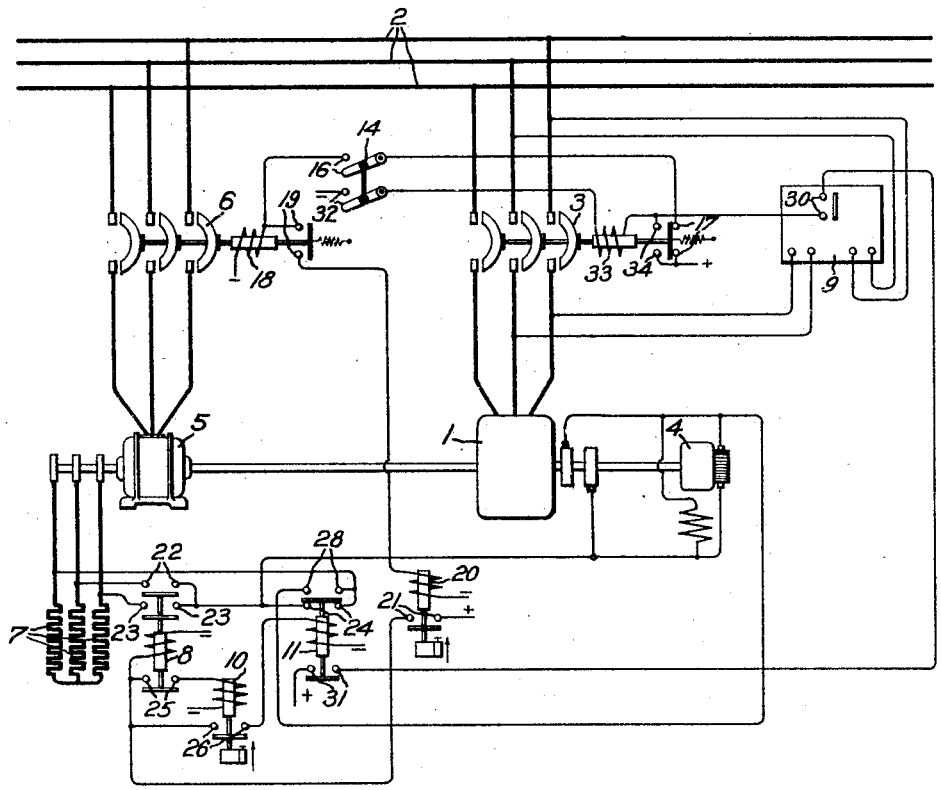
Inventor:
Harold T. Seeley,
by Charles E. Mullen
His Attorney.

Patented Mar. 10, 1931

1,796,220

UNITED STATES PATENT OFFICE

HAROLD T. SEELEY, OF LANSDOWNE, PENNSYLVANIA, ASSIGNOR TO GENERAL ELECTRIC COMPANY, A CORPORATION OF NEW YORK

STARTING ARRANGEMENT FOR DYNAMO-ELECTRIC MACHINES

Application filed May 21, 1929. Serial No. 364,902.

My invention relates to starting arrangements for synchronous dynamo electric machines such as synchronous motors, condensers and the like and its object is to provide an improved starting arrangement whereby a large synchronous machine can be started and automatically brought into synchronism with a system and then connected to the system without producing a large electric disturbance on the system.

My invention will be better understood from the following description when taken in connection with the accompanying drawing and its scope will be pointed out in the appended claims.

Referring to the drawing, which shows diagrammatically a starting arrangement for a synchronous motor, 1 represents a synchronous motor which is adapted to be connected to a polyphase supply circuit 2 by means of a switch 3 which may be of any suitable type examples of which are well known in the art. The field winding of the motor 1 may be supplied with direct current from any suitable source such as an exciter 4 direct connected to the motor 1. As shown in the drawing, the field winding of the motor 1 is permanently connected across the exciter terminals but it is obvious that suitable switching means, examples of which are well known in the art, may be provided in the motor field circuit if desired.

For effecting the starting of the motor 1, I provide a phase wound induction motor 5 which is direct connected to the motor 1. The primary winding of the starting motor 5 is adapted to be connected across the polyphase supply circuit 2 by means of a switch 6 which may be of any suitable type. The starting resistors 7 are provided in the secondary circuit of the starting motor 5 so that the motor has a good starting torque and takes a relatively small starting current from the supply circuit 2. In order that the starting motor 5 may drive the main motor 1 at approximately synchronous speed after the motor 5 has been started, the starting motor 5 has the same number of poles as the synchronous motor 1, and a short-circuiting device shown as a contactor 8 is provided for short-circuiting the resistors 7.

For controlling the closing of the switch 3 between the main motor 1 and the circuit 2, I provide an automatic synchronizer 9 which may be of any suitable type, examples of which are well known in the art, for effecting the closing of a circuit breaker when a predetermined relation exists between the phases of two alternating current circuits. Since the details of such an automatic synchronizer form no part of my present invention and, furthermore, are old and well known in the art, I have shown the automatic synchonizer schematically in order to simplify the disclosure of my present invention. Preferably, the automatic synchronizer 9 is arranged to effect the closing of the switch 3 only when both the frequency difference and the phase difference between the voltages of the motor 1 and the circuit 2 are less than predetermined amounts.

In order to bring the motor 1 into synchronism with the circuit 2 after the starting motor 5 has been started, the phase wound secondary winding of the starting motor 5 is arranged to be supplied with direct current after the starting resistor 7 has been short-circuited long enough to permit the starting motor to reach its maximum speed while operating as an induction motor. As shown, this result is obtained by arranging the contactor 8 so that the operation thereof effects the energization of a suitable time relay 10 which, after being energized a predetermined length of time, effects the operation of a suitable switching device 11 to open the short-circuit around the starting resistors 7 and to connect a suitable source of direct current, such as the exciter 4, to the slip rings of the starting motor 5 so that one terminal of the exciter is connected to one slip ring and the other terminal of the exciter is connected to the other slip rings in parallel. The direct current excitation of the secondary winding of the motor 5 causes the motor 5 to operate as a synchronous motor. Therefore, if the phases of the starting motor 5 and the main motor 1 are chosen correctly, the main motor 1 is now driven in synchronism with the circuit 2 so that the automatic synchronizer can operate to effect the closing of the switch 3.

It will be observed that by employing a phase wound induction motor 5 as a starting motor, I am able to effect the starting of the main motor 1 without causing any appreciable disturbance on the circuit 2, and then by causing the phase wound motor 5 to operate as a synchronous motor, I am able to cause the main motor 1 to operate in synchronism with the circuit 2 so that the motor 1 can be connected thereto without effecting any appreciable disturbance on the circuit.

The starting and stopping of the main motor 1 may be effected in response to the operation of any suitable control means, examples of which are well known in the art. As shown in the drawing, the starting and the stopping of the motor 1 are effected respectively by the closing and the opening of a manually controlled switch 14.

The operation of the arrangement shown in the drawing is as follows:

When the control switch 14 is open, the switches 3 and 6 are open and the other control devices occupy the positions in which they are shown in the drawing. When the control switch 14 is closed its contacts 16 complete through the auxiliary contact 17 on the open switch 3 an energizing circuit for the closing coil 18 of the switch 6 so that the primary winding of the starting motor 5 is connected across the supply circuit 2 to start the main motor 1. The closing of the auxiliary contacts 19 on the switch 6 completes through the auxiliary contacts 17 on the switch 3 and the contacts 16 of the control switch 14 an energizing circuit for the operating coil of a suitable time relay 20 which, after a predetermined length of time, closes its contacts 21 and completes an energizing circuit for the resistor short-circuiting contactor 8. The closing of the contacts 22 and 23 of the contactor 8 completes through the contacts 24 of the relay 11 a short-circuit around the starting resistors 7. The short-circuiting of the resistor 7 causes the starting motor 5 to increase its speed to the maximum value at which it operates as an induction motor.

The contactor 8 by closing its auxiliary contacts 25 completes through the contacts 21 of the relay 20 an energizing circuit for the coil of the time relay 10 which after being energized a predetermined length of time closes its contacts 26 and completes an energizing circuit for the operating winding of the relay 11. The relay 11 by opening its contacts 24 opens the short-circuit around the starting resistors 7 and by closing its contacts 28 connects the exciter 4 to the slip rings of the starting motor 5 so that the secondary winding of the starting motor 5 is supplied with direct current from the exciter 4. This direct current through the secondary winding of the starting motor 5 causes the motor to operate as a synchronous motor and, therefore, the main motor 1 is driven at synchronous speed. By properly mounting the rotors of the motors 1 and 5 on the common shaft the motor 1 now will be in synchronism with the circuit 2 so that the automatic synchronizing means 9 can operate to effect the closing of the switch 3.

When the desired phase and frequency relation exists between the voltage of the motor 1 and the circuit 2 after the relay 11 is energized, the automatic synchronizing device 9 operates to close its contacts 30 and thereby complete through the contacts 31 of the relay 11 and the contacts 32 of the control switch 14 an energizing circuit for the closing coil 33 of the switch 3 to effect the connection of the main motor 1 to the circuit 2. The switch 3 by closing its auxiliary contacts 34 completes a locking circuit for the closing coil 33 which is independent of the contacts 30 of the automatic synchronizer 9.

When the switch 3 closes, the opening of its auxiliary contacts 17 effects the deenergization of the closing coil 18 of the switch 6 so that the primary winding of the starting motor 5 is disconnected from the supply circuit 2. The opening of the auxiliary contacts 17 also effects the deenergization of the relay 20 which, in turn, effects the deenergization of the short-circuiting contactor 8 and the relays 10 and 11 so that the starting resistors 7 are again connected in the secondary circuit of the motor, and therefore are operative to limit the starting current when the starting motor 5 is again connected to the supply circuit 2.

When it is desired to shut down the motor 1, the control switch 14 is opened. The opening of the contacts 32 of the control switch 14 effects the deenergization of the closing coil 33 of the switch 3 so that this switch opens and disconnects the motor 1 from the supply circuit 2.

While I have, in accordance with the patent statutes, shown and described my invention as applied to a particular system and as embodying various devices diagrammatically indicated, changes and modifications will be obvious to those skilled in the art, and I, therefore, aim in the appended claims to cover all such changes and modifications as fall within the true spirit and scope of my invention.

What I claim as new and desire to secure by Letters Patent of the United States is:

1. In combination, an alternating current circuit, a synchronous dynamo-electric machine, a starting motor for said machine having its primary winding connected to said circuit, means for controlling the speed of said motor and for effecting the energization of the secondary winding of said motor with direct current, and means responsive to the relative phases of said machine and circuit for effecting the connection of said machine to said circuit and the disconnection of said motor from said circuit.

2. In combination, an alternating current circuit, a synchronous dynamo-electric machine, a phase wound induction starting motor for said machine having its primary winding connected to said circuit, a source of direct current, means for controlling the resistance of the secondary circuit of said motor and for effecting the connection of said source of direct current to the secondary circuit of said motor, and means responsive to the relative phases of said machine and circuit for effecting the connection of said machine to said circuit and the disconnection of the primary of said motor from said circuit.

3. In combination, an alternating current circuit, a synchronous dynamo-electric machine, a phase wound induction starting motor for said machine having its primary winding connected to said circuit and having the same number of poles as said machine, resistance means connected in the secondary circuit of said motor, a source of direct current, means for decreasing the amount of said resistance means in the secondary circuit of said motor, means controlled by said resistance controlling means for connecting the secondary winding of said motor to said source of direct current, and means responsive to the relative phases of said machine and circuit for effecting the connection of said machine to said circuit and the disconnection of the primary winding of said machine from said circuit.

4. In combination, an alternating current circuit, a synchronous dynamo-electric machine, a phase wound induction starting motor for said machine having its primary winding connected to said circuit and having the same number of poles as said machine, resistors connected in the secondary circuit of said motor, a source of direct current, means for short-circuiting said resistors, means controlled by said short-circuiting means for connecting said source to the secondary winding of said motor, means responsive to the relative phases of said machine and circuit for effecting the connection of said machine to said circuit, and means controlled by said last-mentioned connecting means for effecting the disconnection of the primary winding of said motor from said circuit when said machine is connected to said circuit.

5. In combination, an alternating current circuit, a synchronous dynamo-electric machine, a starting motor for said machine having its primary winding connected to said circuit and having the same number of poles as said synchronous machine, means for controlling the speed of said motor and for effecting the energization of the secondary winding of said motor with direct current, means for connecting said machine to said circuit, and means controlled by said connecting means for effecting the disconnection of the primary winding of said motor from said circuit when said machine is connected to said circuit.

6. In combination, an alternating current circuit, a synchronous dynamo-electric machine, a phase wound induction starting motor for said machine having its primary winding connected to said circuit and having the same number of poles as said synchronous machine, resistors connected in the secondary circuit of said motor, a source of direct current, means for short-circuiting said resistors, timing means controlled by said short-circuiting means for connecting said source to the secondary winding of said motor after said resistors have been short-circuited a predetermined length of time, means for connecting said machine to said circuit, and means controlled by said last-mentioned connecting means for effecting the disconnection of the primary winding of said motor from said circuit when said machine is connected to said circuit.

In witness whereof, I have hereunto set my hand this 18th day of May, 1929.

HAROLD T. SEELEY.